(12) United States Patent
Yasui et al.

(10) Patent No.: US 11,833,722 B2
(45) Date of Patent: Dec. 5, 2023

(54) RESIN MOLDING APPARATUS AND METHOD OF MANUFACTURING RESIN MOLDED PRODUCT

(71) Applicant: TOWA CORPORATION, Kyoto (JP)

(72) Inventors: Hayato Yasui, Kyoto (JP); Yohei Onishi, Kyoto (JP); Hitoshi Okazaki, Kyoto (JP)

(73) Assignee: Towa Corporation, Kyoto (JP)

(*) Notice: Subject to any disclaimer, the term of this patent is extended or adjusted under 35 U.S.C. 154(b) by 9 days.

(21) Appl. No.: 17/407,746

(22) Filed: Aug. 20, 2021

(65) Prior Publication Data

US 2022/0063149 A1   Mar. 3, 2022

(30) Foreign Application Priority Data

Aug. 25, 2020 (JP) .................... 2020-141384

(51) Int. Cl.
| | |
|---|---|
| *B29C 43/36* | (2006.01) |
| *B29C 43/18* | (2006.01) |
| *B29L 31/34* | (2006.01) |

(52) U.S. Cl.
CPC .............. *B29C 43/18* (2013.01); *B29C 43/36* (2013.01); *B29C 2043/181* (2013.01); *B29L 2031/3406* (2013.01)

(58) Field of Classification Search
CPC ............ B29C 43/18; B29C 2043/3665; B29C 2043/3602; B29C 43/36; B29C 43/181
USPC .................................................... 264/272.11
See application file for complete search history.

(56) References Cited

U.S. PATENT DOCUMENTS

| | | | |
|---|---|---|---|
| 9,728,426 B2 * | 8/2017 | Okada | ................... H01L 23/552 |
| 2018/0243953 A1 * | 8/2018 | Shimoda | ............... B29C 33/303 |

FOREIGN PATENT DOCUMENTS

| | | | |
|---|---|---|---|
| CN | 107685412 A | | 2/2018 |
| CN | 108688050 A | | 10/2018 |
| CN | 108789988 A | | 11/2018 |
| CN | 111216301 A | | 6/2020 |
| JP | H11251346 A | * | 9/1999 |
| JP | 3377433 B2 | | 2/2003 |
| JP | 6525580 B2 | | 5/2019 |

OTHER PUBLICATIONS

English translation of JP H11251346 A (Year: 1999).*
Search Report and Written Opinion dated Aug. 24, 2022 in Singapore Application No. 10202109060X.

* cited by examiner

*Primary Examiner* — Susan D Leong
*Assistant Examiner* — John W Hatch
(74) *Attorney, Agent, or Firm* — Knobbe Martens Olson & Bear LLP

(57) ABSTRACT

A resin molding apparatus includes: a first molding mold provided with a first member and a second member configured to move relative to the first member, and configured to form a cavity by the first member and the second member; a second molding mold configured to hold a substrate; and a mask member so as to be relatively immovable with respect to the first member, configured to make contact with a portion of the substrate when the first molding mold and the second molding mold are clamped, and formed with a flow portion through which a resin material existing in the cavity and pressurized by the second member is capable of flowing.

10 Claims, 15 Drawing Sheets

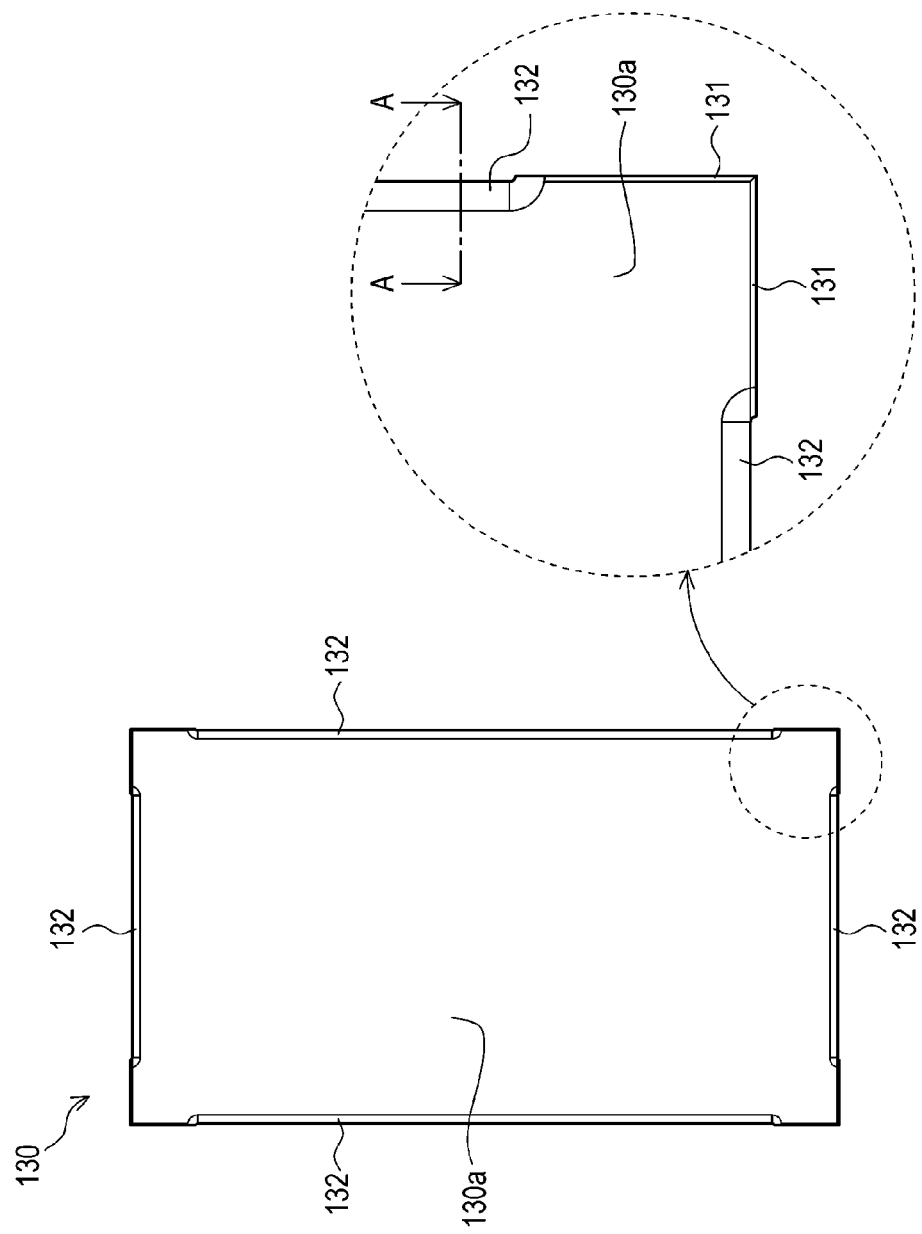

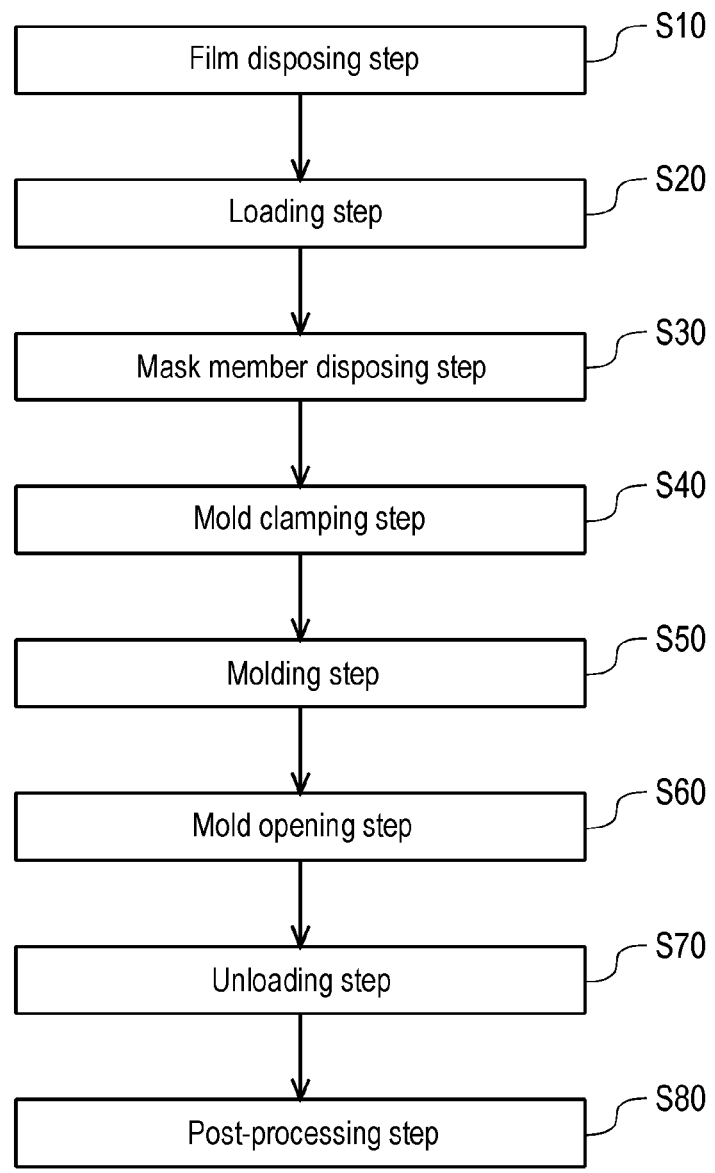

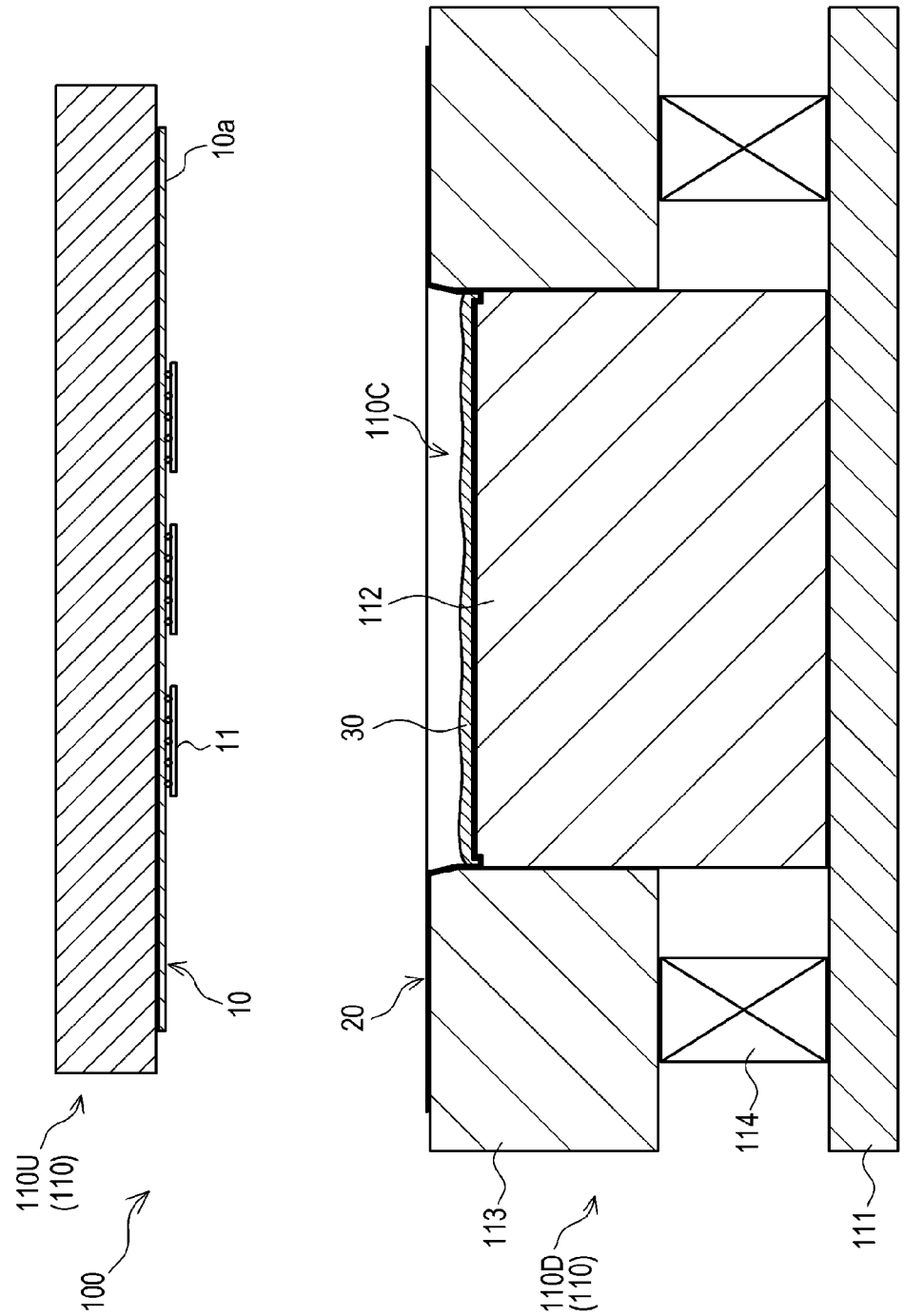

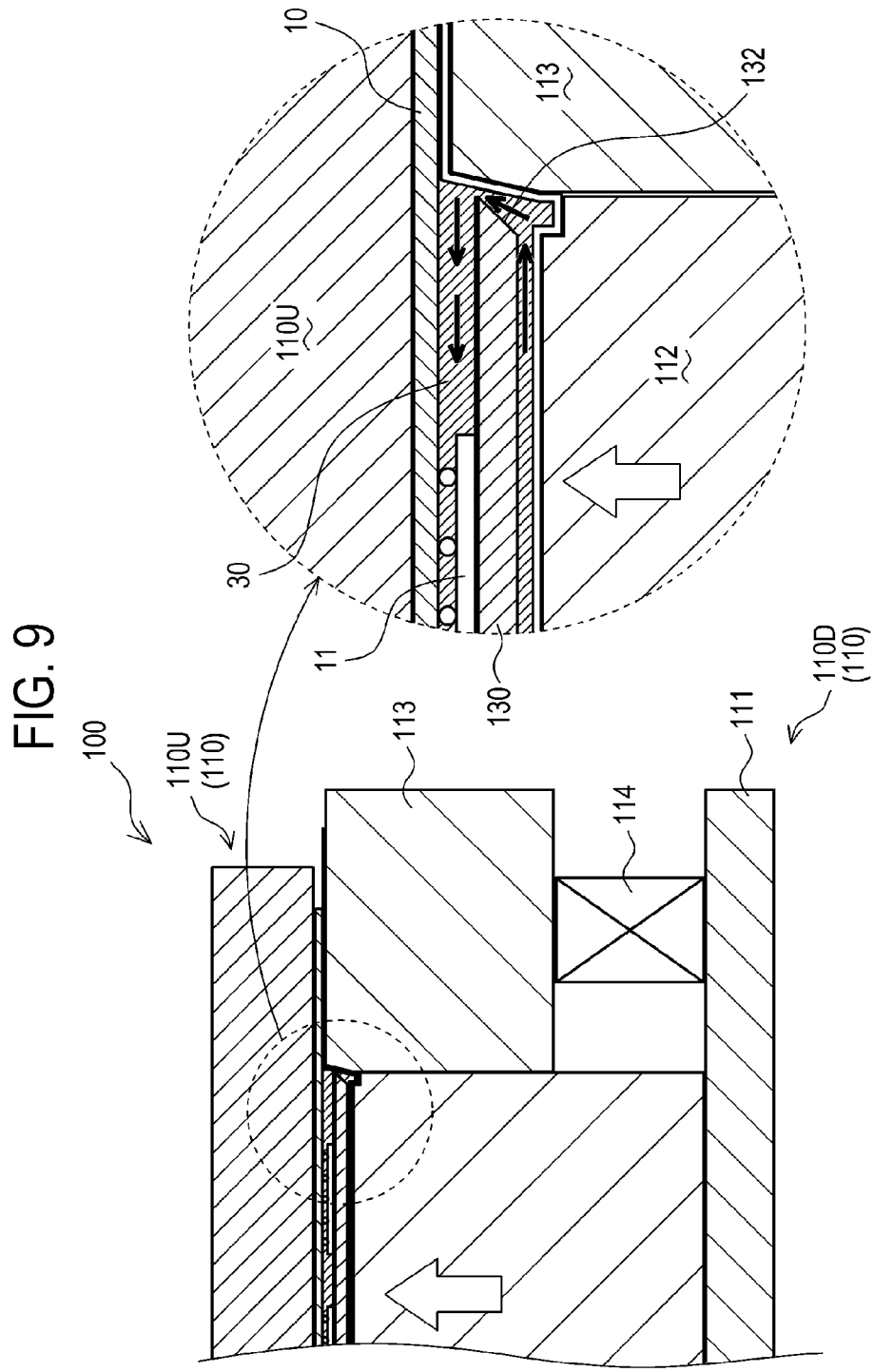

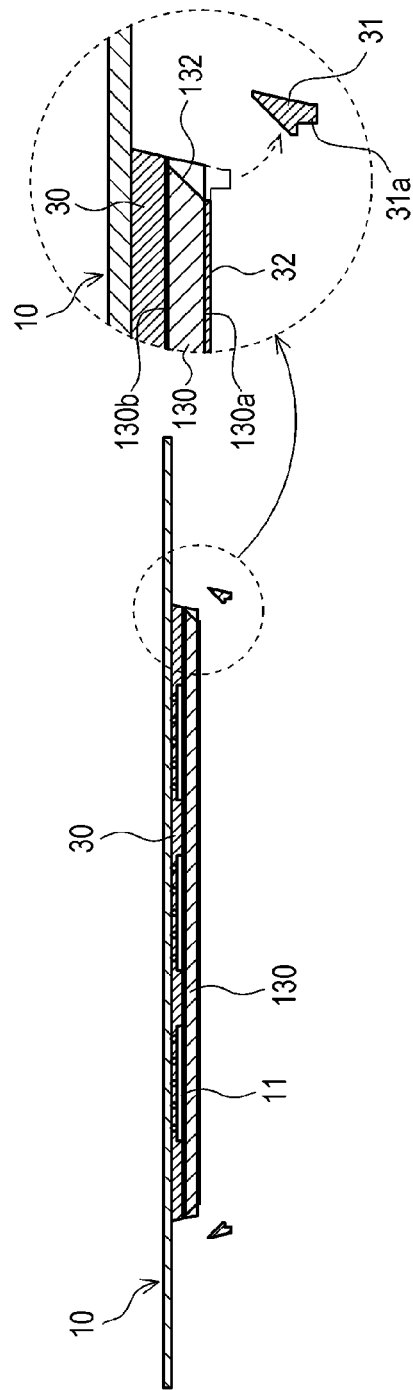

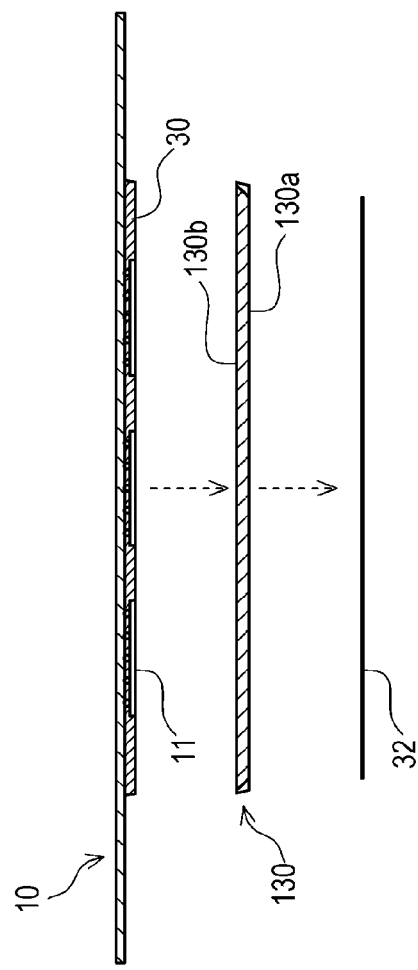

RESIN MOLDING APPARATUS AND METHOD OF MANUFACTURING RESIN MOLDED PRODUCT

CROSS-REFERENCE TO RELATED APPLICATION

This application is based upon and claims the benefit of priority from Japanese Patent Application No. 2020-141384, filed on Aug. 25, 2020, the entire contents of which are incorporated herein by reference.

TECHNICAL FIELD

The present disclosure relates to a resin molding apparatus and a method of manufacturing a resin molded product.

BACKGROUND

In the Patent Document 1, there is known a resin molding apparatus capable of performing resin molding by exposing a portion (a connection electrode portion or the like) of a substrate. The lower mold of the resin molding apparatus includes a side surface member and a bottom surface member that can be raised and lowered inside the side surface member. A cavity is formed by the side surface member and the bottom surface member. Further, a concave space is formed in the bottom surface member or the side surface member. A substrate holding pin is supported via an elastic member arranged in the space.

When clamping the lower mold configured in this way and an upper mold to which the substrate is fixed, a part of the substrate comes into contact with the tip of the substrate holding pin. At this time, the substrate holding pin moves downward by being pushed by the substrate and contracts the elastic member. In this way, the substrate holding pin is pressed against the substrate by the elastic force of the elastic member. By performing resin molding in this state, it is possible to obtain a resin molded product in which a portion of the substrate (the portion in contact with the substrate holding pin) is exposed.

PRIOR ART DOCUMENTS

[Patent Document]
Patent Document 1: Japanese Laid-Open Patent Publication No. 6525580

In the technique of performing resin molding by exposing a portion of the substrate in this way, there is a need to further reduce the manufacturing cost.

SUMMARY

Some embodiments of the present disclosure provide a resin molding apparatus and a resin molded product manufacturing method capable of reducing the manufacturing cost.

According to one embodiment of the present disclosure, there is provided a resin molding apparatus. The resin molding apparatus includes: a first molding mold provided with a first member and a second member configured to move relative to the first member, and configured to form a cavity by the first member and the second member; a second molding mold configured to hold a substrate; and a mask member supported so as to be relatively immovable with respect to the first member, configured to make contact with a portion of the substrate when the first molding mold and the second molding mold are clamped, and formed with a flow portion through which a resin material existing in the cavity and pressurized by the second member can flow.

According to another embodiment of the present disclosure, there is provided a method of manufacturing a resin molded product by using the resin molding apparatus.

According to another embodiment of the present disclosure, there is provided a method of manufacturing a resin molded product. The method of manufacturing a resin molded product includes: disposing a mask member so as to be relatively immovable with respect to a first molding mold forming a cavity in which a resin material is accommodated; clamping the first molding mold and a second molding mold holding a substrate, and bringing the disposed mask member into contact with a portion of the substrate; and performing a resin molding on the substrate by pressurizing the resin material in the cavity to allow the resin material to flow through a flow portion formed in the mask member.

BRIEF DESCRIPTION OF DRAWINGS

The accompanying drawings, which are incorporated in and constitute a part of the specification, illustrate embodiments of the present disclosure.

FIGS. 4A and 4B are a bottom view of the mask member and a sectional view taken along line A-A, respectively.

FIG. 5 is a flowchart showing a method of manufacturing a resin molded product.

FIG. 6 is a side sectional view of the resin molding apparatus for explaining a film disposing step and a loading step.

FIG. 9 is a side sectional view of the resin molding apparatus for explaining a molding step.

FIGS. 10A and 10B are side sectional views of the substrate for explaining a post-processing step.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Hereinafter, a resin molding apparatus 100 according to an embodiment of the present disclosure will be described with reference to FIGS. 1 to 3. The drawings used in the following description are for conceptually explaining the configuration of the resin molding apparatus 100. For the sake of convenience of explanation, the dimensions and the like of respective parts may be exaggerated, or the shapes and the like of members may be appropriately simplified.

The resin molding apparatus 100 manufactures a resin molded product by encapsulating electronic components such as a semiconductor chip 11 and the like disposed on a surface 10a of a substrate 10 with a resin. In the present embodiment, as an example, there is shown a resin molding apparatus 100 capable of performing resin molding by a compression molding method.

First, the substrate 10 to be resin-encapsulated by the resin molding apparatus 100 will be described.

Figure 3:
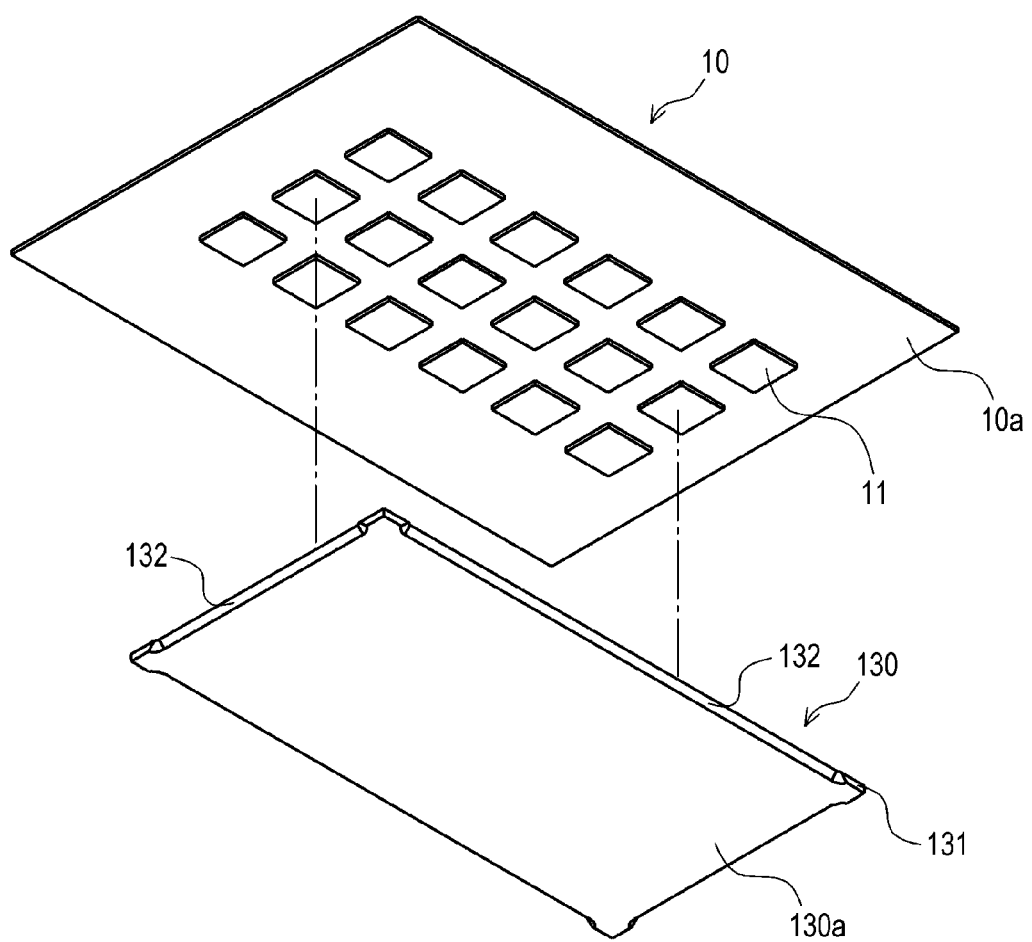
FIG. 3 is a downward perspective view showing a positional relationship between the substrate and the mask member.

As shown in FIG. 3, the substrate 10 is formed in a rectangular flat plate shape. A plurality of semiconductor chips 11 formed in a rectangular flat plate shape is disposed on the surface 10a of the substrate 10 at an appropriate pitch.

Examples of the substrate 10 include a semiconductor substrate such as a silicon wafer or the like, a lead frame, a printed wiring board, a metal substrate, a resin substrate, a glass substrate, a ceramic substrate, and the like. Further, the substrate 10 may be a carrier used for FOWLP (Fan-Out Wafer Level Packaging) and FOPLP (Fan-Out Panel Level Packaging).

Next, a specific configuration of the resin molding apparatus 100 will be described.

Figure 1:
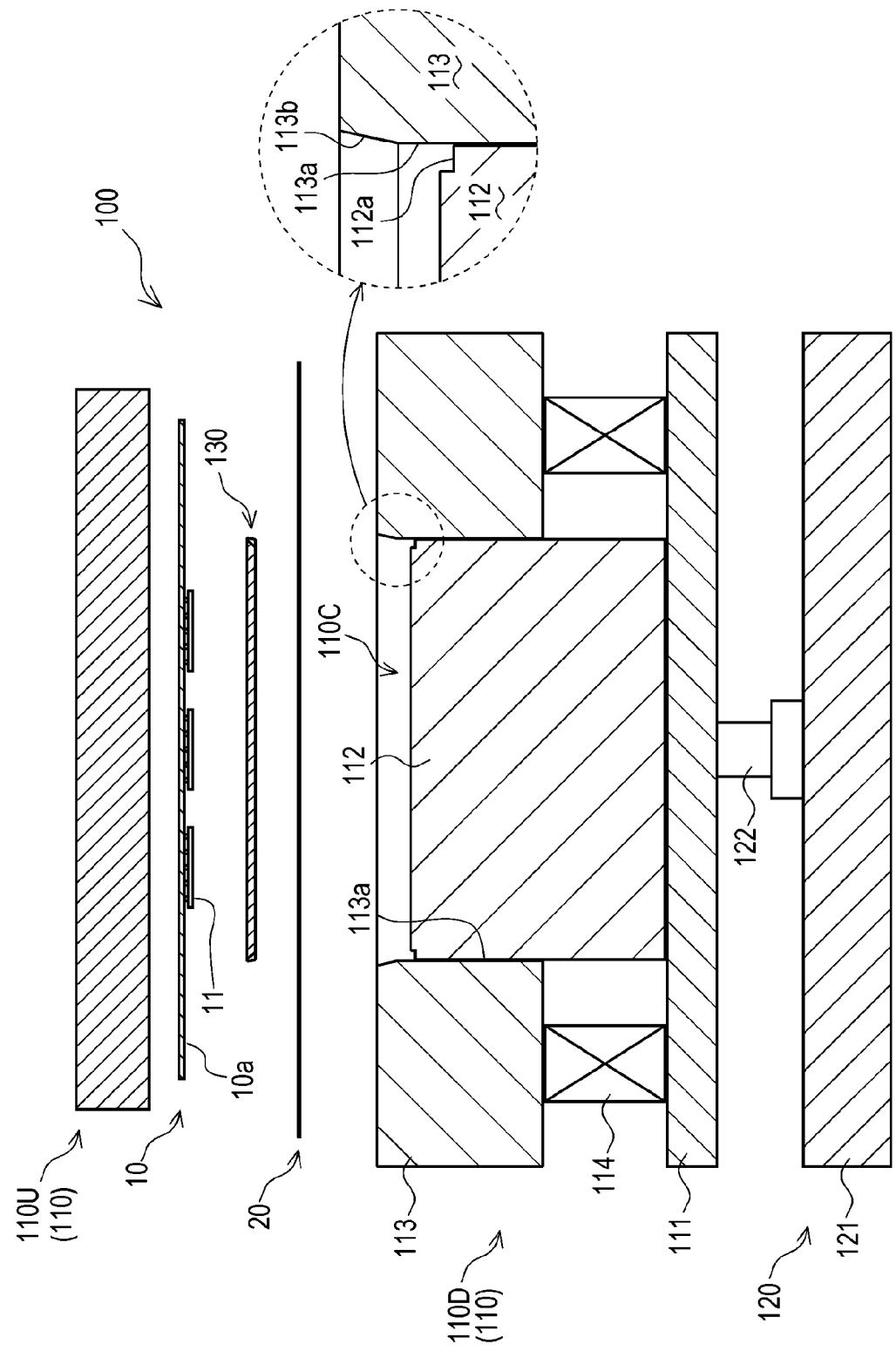
FIG. 1 is a side sectional view showing an overall configuration of a resin molding apparatus according to an embodiment of the present disclosure.

The resin molding apparatus 100 shown in FIG. 1 mainly includes a molding mold 110 (including a lower mold 110D and an upper mold 110U), a mold clamping mechanism 120, a mask member 130, and the like.

The molding mold 110 includes the lower mold 110D and the upper mold 110U, and forms a cavity 110C for molding a resin material 30. The lower mold 110D and the upper mold 110U are embodied forms of a first molding mold and a second molding mold according to the present disclosure.

The lower mold 110D mainly includes a lower mold base member 111, a bottom surface member 112, a side surface member 113, an elastic member 114, and the like.

The lower mold base member 111 shown in FIG. 1 supports the bottom surface member 112, the side surface member 113, and the like, which will be described later.

Figure 2:
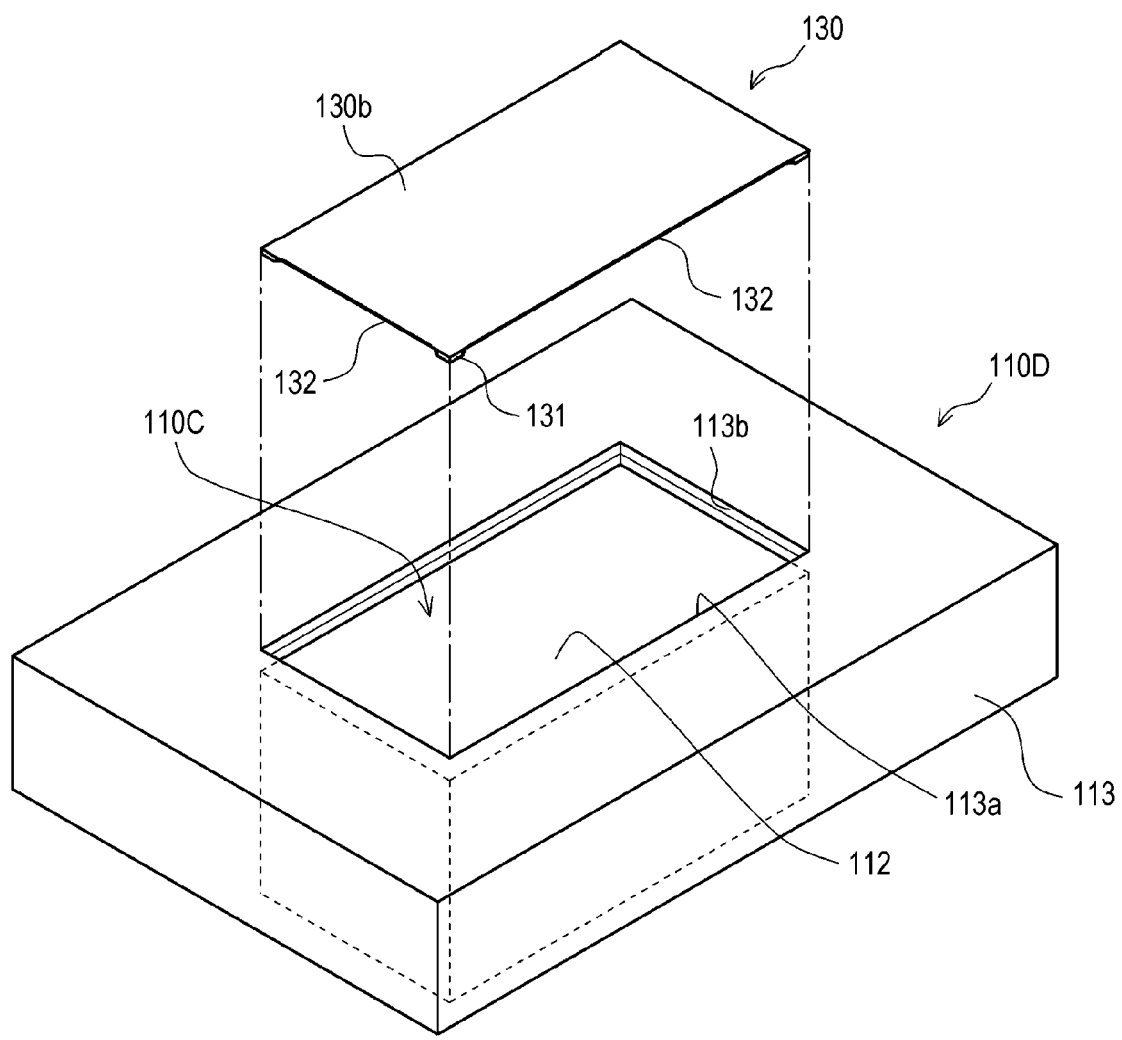
FIG. 2 is an upward perspective view showing a positional relationship between a lower mold and a mask member.

The bottom surface member 112 shown in FIGS. 1 and 2 forms a bottom surface of the cavity 110C. The bottom surface member 112 is an embodied form of a second member according to the present disclosure. The bottom surface member 112 is formed in a rectangular shape in a plan view. The bottom surface member 112 is formed so as to have an appropriate vertical width. The bottom surface member 112 is disposed in a state in which it is placed on the upper surface of the lower mold base member 111. On the upper surface of the bottom surface member 112, a recess 112a slightly recessed downward is formed over the entire outer circumference (see FIG. 1).

The side surface member 113 forms the side surface of the cavity 110C. The side surface member 113 is an embodied form of a first member according to the present disclosure. The side surface member 113 is formed in a rectangular shape in a plan view. The side surface member 113 is formed so as to have an appropriate vertical width. The side surface member 113 mainly includes a hollow portion 113a, a tapered portion 113b, and the like.

The hollow portion 113a is formed so as to vertically penetrate the center of the side surface member 113. The hollow portion 113a is formed in a rectangular shape in a plan view. The hollow portion 113a is formed in such a shape that substantially matches the outer shape of the bottom surface member 112 in a plan view.

The tapered portion 113b is an inclined surface formed in the hollow portion 113a. The tapered portion 113b is an embodied form of a second tapered portion according to the present disclosure. The tapered portion 113b is formed over the entire circumference of the upper end portion of the hollow portion 113a. The tapered portion 113b is formed so as to gradually expand outward toward the upper end of the hollow portion 113a (see FIG. 1).

In this way, the side surface member 113 is formed in a frame shape having a rectangular shape in a plan view. The bottom surface member 112 is disposed in the hollow portion 113a of the side surface member 113. The side surface member 113 is disposed in a state in which it is mounted on the upper surface of the lower mold base member 111 via the elastic member 114 described later. The upper surface of the side surface member 113 is located higher than the upper surface of the bottom surface member 112. In this way, there is formed the cavity 110C having a rectangular shape in a plan view and surrounded by the bottom surface member 112 and the side surface member 113 from below and from a lateral side.

The elastic member 114 shown in FIG. 1 is disposed between the side surface member 113 and the lower mold base member 111. The elastic member 114 is formed of, for example, a compression coil spring that can be expanded and contracted up and down.

Suction holes (not shown) for sucking and holding a release film 20 are appropriately formed on the upper surface of the lower mold 110D (the bottom surface member 112 and the side surface member 113). The release film 20 can be sucked and held by applying a negative pressure to the suction holes with a vacuum pump or the like (not shown).

The upper mold 110U is capable of holding the substrate 10. The upper mold 110U is formed so as to have an appropriate vertical width. Suction holes (not shown) for sucking and holding the substrate 10 are appropriately formed on the bottom surface of the upper mold 110U. The substrate 10 can be sucked and held by applying a negative pressure to the suction holes with a vacuum pump or the like (not shown).

The mold clamping mechanism 120 moves the lower mold 110D up and down to perform mold clamping, mold opening, and the like. The mold clamping mechanism 120 mainly includes a base 121, a drive mechanism 122, and the like.

The base 121 supports the molding mold 110 and the like. The base 121 is disposed below the molding mold 110 (the lower mold 110D).

The drive mechanism 122 is configured to raise and lower the lower mold 110D. As the drive mechanism 122, it may be possible to use a ball screw mechanism, a hydraulic cylinder, a toggle mechanism, or the like. The drive mechanism 122 is disposed between the base 121 and the lower base member 111. In FIG. 2 and subsequent figures, the mold clamping mechanism 120 is omitted as appropriate.

The mask member 130 shown in FIGS. 1 to 4 comes into contact with the semiconductor chips 11 on the substrate 10 during resin molding, thereby preventing the resin material 30 from adhering to the lower surfaces of the semiconductor chips 11 (the surfaces opposite to the substrate 10). The mask member 130 is formed in a rectangular flat plate shape. The mask member 130 is formed with a size at which the mask member 130 can make contact with all the semiconductor chips 11 provided on the substrate 10 (see FIG. 3). The outer shape of the mask member 130 is formed to have substantially the same shape as the shape of the hollow portion 113a of the side surface member 113 in a plan view (see FIG. 2). The mask member 130 mainly includes tapered portions 131, injection ports 132, and the like.

Figure 4B:
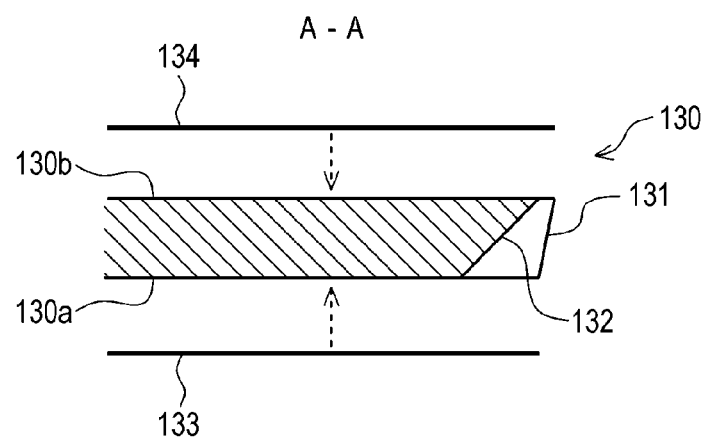

The tapered portions 131 shown in FIGS. 4A and 4B are inclined surfaces formed on the outer peripheral portion of the mask member 130 (the side surface portion in the state in which the mask member 130 is disposed on the lower mold 110D as shown in FIG. 2). The tapered portions 131 are an embodied example of first tapered portions according to the present disclosure. The tapered portions 131 are formed over the entire outer peripheral portion of the mask member 130. Each of the tapered portions 131 are formed so as to gradually expand outward from one surface of the mask member 130 (the surface facing downward when the mask member 130 is disposed on the lower mold 110D, hereinafter referred to as "lower surface 130a") to the other surface (hereinafter referred to as "upper surface 130b").

The injection ports 132 are flow routes through which the resin material 30 flows during resin molding. The injection ports 132 are an embodied example of flow portions according to the present disclosure. The injection ports 132 are formed on the outer peripheral portion of the mask member 130. The injection ports 132 are formed in a concave shape as if the outer peripheral portion of the mask member 130 is cut out inward. The injection ports 132 are formed in a tapered shape so as to gradually expand outward from the lower surface 130a of the mask member 130 toward the upper surface 130b thereof. The injection ports 132 are formed at paired positions so as to face each other with the center of the mask member 130 interposed therebetween. Specifically, the injection ports 132 are formed on the respective sides of the mask member 130 formed in a rectangular shape. Each of the injection ports 132 is formed from the vicinity of one end to the vicinity of the other end on each side of the mask member 130. By forming the injection ports 132 in this way, the tapered portions 131 are formed only at the four corners (four apex portions) of the mask member 130.

The thickness of the mask member 130 may be appropriately set depending on the type of the resin material 30, the thickness of the substrate 10 and the thickness of the package. In the post-processing step S80 described later, the thickness of the mask member 130 is preferably set to about 0.5 to 3 mm in order to easily cut away the unnecessary resin material 30 (unnecessary resin 31) formed in the injection ports 132.

As will be described later, the material of the mask member 130 is not particularly limited as long as it can withstand the pressure (molding pressure) when the substrate 10 is resin-molded. Examples of the material that can withstand the molding pressure include metals such as stainless steel, iron and the like.

Further, the mask member 130 is provided with a release sheet 133 and a double-sided tape 134. The release sheet 133 is attached so as to cover the entire lower surface 130a of the mask member 130. The double-sided tape 134 is attached so as to cover the entire upper surface 130b of the mask member 130.

The operation of each part of the resin molding apparatus 100 described above is appropriately controlled by a control device (not shown).

Next, a method of manufacturing a resin molded product using the resin molding apparatus 100 configured as described above will be described.

As shown in FIG. 5, a method of manufacturing a resin molded product according to the present embodiment mainly includes a film disposing step S10, a loading step S20, a mask member disposing step S30, a mold clamping step S40, a molding step S50, a mold opening step S60, an unloading step S70 and a post-processing step S80. Hereinafter, these steps will be described in order.

The film disposing step S10 is a step of disposing the release film 20 on the lower mold 110D.

Specifically, in the film disposing step S10, the release film 20 is loaded into the molding mold 110 by a certain transfer device. As shown in FIG. 1, the release film 20 is formed so as to have a size and shape at which the release film 20 can cover substantially the entire lower mold 110D (at least the cavity 110C). The release film 20 is disposed on the upper surface of the lower mold 110D and then is sucked and held by the lower mold 110D. As a result, as shown in FIG. 6, the release film 20 is disposed so as to conform to the shape of the upper surface of the lower mold 110D.

After the release film 20 is sucked to the lower mold 110D, the process proceeds from the film disposing step S10 to the loading step S20.

The loading step S20 is a step of loading the substrate 10 and the resin material 30 into the molding mold 110.

Specifically, in the loading step S20, the substrate 10 and the resin material 30 are loaded into the molding mold 110 by a certain transfer device. As shown in FIG. 6, the substrate 10 is sucked and held by the upper mold 110U in a state in which the surface 10a having the semiconductor chips 11 faces downward. The resin material 30 is accommodated in the cavity 110C of the lower mold 110D. As the resin material 30, it may be possible to use resins in various states such as a granule state, a powder state, a particle state, a paste state, a liquid state, and the like.

After the loading of the substrate 10 and the resin material 30 is completed, the process proceeds from the loading step S20 to the mask member disposing step S30.

The mask member disposing step S30 is a step of disposing the mask member 130 on the molding mold 110.

Figure 7:
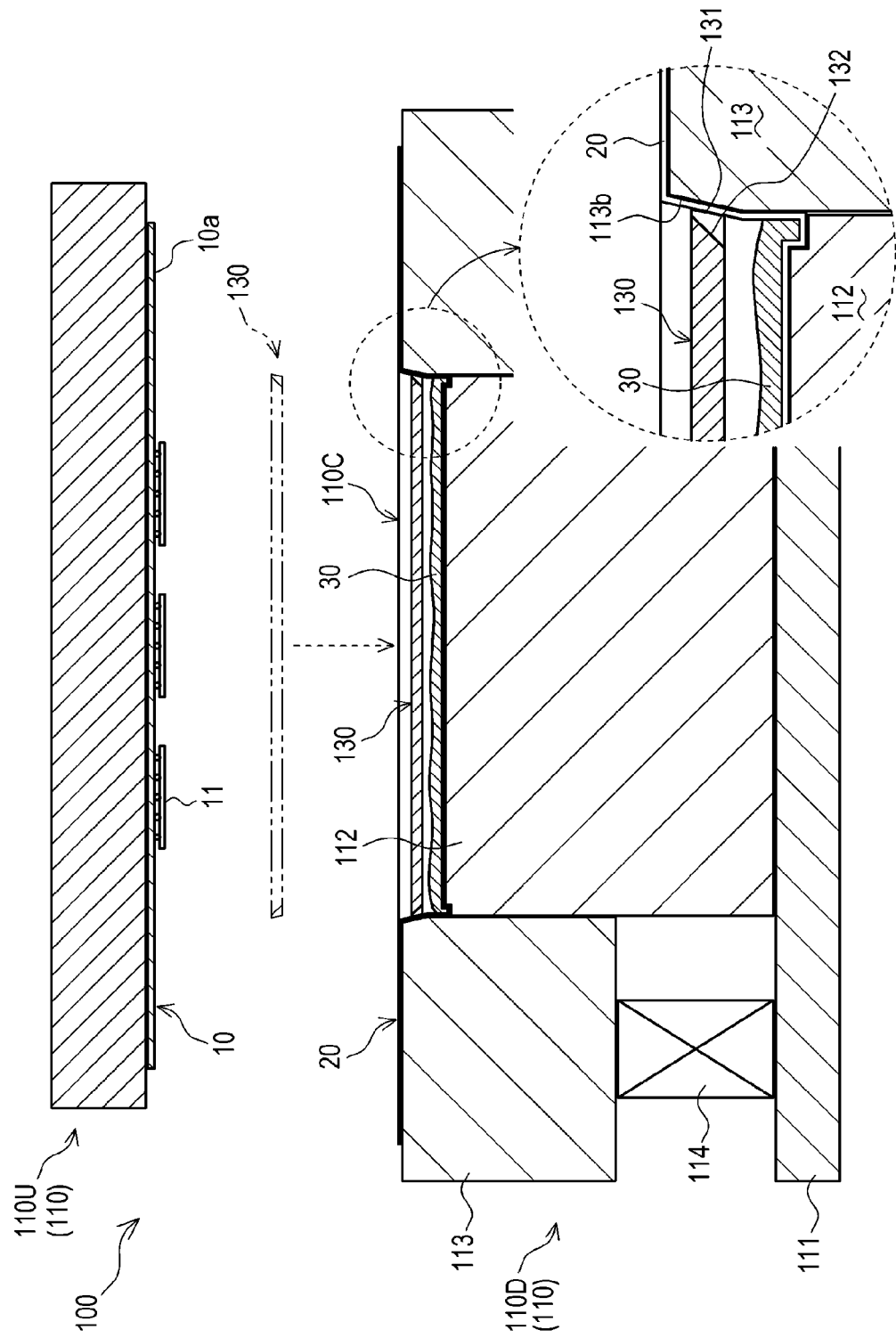
FIG. 7 is a side sectional view of the resin molding apparatus for explaining a mask member disposing step.

Specifically, in the mask member disposing step S30, the mask member 130 is loaded into the molding mold 110 by a certain transfer device. As shown in FIG. 7, the mask member 130 is placed on the side surface member 113 of the lower mold 110D. In this operation, the tapered portion 113b of the side surface member 113 and the tapered portions 131 of the mask member 130 are disposed so as to make contact with each other (strictly speaking, so as to make contact with each other via the release film 20). Since the mask member 130 is guided to a predetermined position by the tapered portions 113b and the tapered portions 131, the mask member 130 can be easily positioned with respect to the lower mold 110D. In this way, the mask member 130 is disposed so as to cover the resin material 30 accommodated in the cavity 110C from above. In the drawings, the hatching showing the cross section of the release film 20 is omitted for the sake of convenience.

When the mask member 130 is placed on the side surface member 113 in this way, the mask member 130 is supported by the side surface member 113 so as to be relatively immovable with respect to the side surface member 113. That is, except when an external force is intentionally applied to the mask member 130 (for example, when the mask member 130 is unloaded from the molding mold 110), the positional relationship (relative positional relationship)

between the side surface member 113 and the mask member 130 does not change. For example, when the side surface member 113 moves up and down, the mask member 130 also moves up and down together with the side surface member 113. Therefore, the positional relationship between the side surface member 113 and the mask member 130 does not change.

After the arrangement of the mask member 130 is completed, the process proceeds from the mask member disposing step S30 to the mold clamping step S40.

The mold clamping step S40 is a step of closing (clamping) the molding mold 110 (the lower mold 110D and the upper mold 110U).

Figure 8:
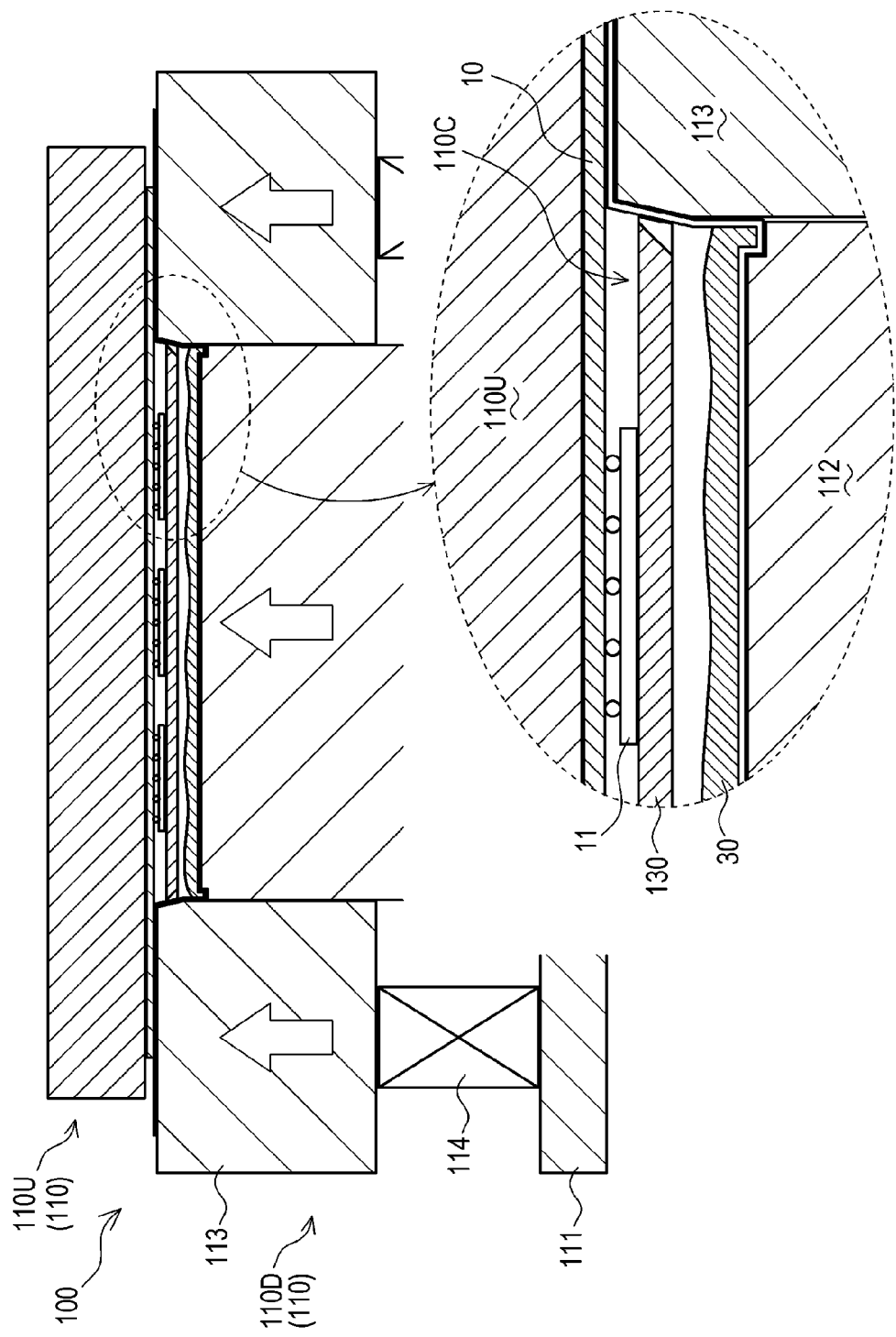
FIG. 8 is a side sectional view of the resin molding apparatus for explaining a mold clamping step.

Specifically, in the mold clamping step S40, the resin material 30 accommodated in the cavity 110C is first melted by a heating mechanism (not shown) provided in the lower mold 110D. Next, by driving the drive mechanism 122, the lower mold 110D is moved up toward the upper mold 110U. When the lower mold 110D is moved up to a predetermined position, as shown in FIG. 8, the upper surface of the side surface member 113 comes into contact with the lower surface (surface 10a) of the substrate 10, and the cavity 110C is closed from above by the substrate 10.

At this time, the lower surface of each of the semiconductor chips 11 provided on the substrate 10 comes into contact with the upper surface 130b of the mask member 130 disposed on the side surface member 113. The mask member 130 is attached to the substrate 10 (the semiconductor chips 11) by the double-sided tape 134 (see FIGS. 4A and 4B) provided on the upper surface 130b of the mask member 130. By covering the lower surfaces of the semiconductor chips 11 with the mask member 130 in this way, it is possible to prevent the resin from adhering to the lower surfaces of the semiconductor chips 11.

When performing the mold clamping, it is preferable to suck the air in the cavity 110C to reduce the pressure in the cavity 110C. By doing so, the air (air bubbles) in the resin material 30 can be discharged.

After the mold clamping is completed, the process proceeds from the mold clamping step S40 to the molding step S50.

The molding step S50 is a step of performing resin molding on the substrate 10.

Specifically, in the molding step S50, by driving the drive mechanism 122, the bottom surface member 112 of the lower mold 110D is further moved up toward the upper mold 110U as shown in FIG. 9. At this time, the side surface member 113 makes contact with the substrate 10 (the upper mold 110U) and, therefore, does not move upward. That is, the bottom surface member 112 moves upward relative to the side surface member 113.

When the bottom surface member 112 moves upward, the resin material 30 in the cavity 110C is pressurized and injected into the space above the mask member 130 (the space on the side of the substrate 10) via the injection ports 132 formed on the outer peripheral portion of the mask member 130. Since the injection ports 132 are formed in a tapered shape as described above, the resin material 30 flows toward the substrate 10 via a gradually narrowing (throttled) flow path as schematically shown by an arrow in FIG. 9.

Further, since the injection ports 132 are formed on the respective sides of the mask member 130 formed in a rectangular shape (see FIGS. 4A and 4B), the resin material 30 flowing from the injection ports 132 toward the substrate 10 flows from four directions (four injection ports 132) toward the center of the substrate 10. In this way, the semiconductor chips 11 are immersed in the molten resin material 30. Since the lower surfaces of the semiconductor chips 11 are covered with the mask member 130 at this time, the lower surfaces of the semiconductor chips 11 are not covered with the resin material 30. That is, the resin molding can be performed so that the lower surfaces of the semiconductor chips 11 are exposed. By waiting for a predetermined time in this state, the resin material 30 is cured.

After the resin material 30 is cured, the process proceeds from the molding step S50 to the mold opening step S60.

The mold opening step S60 is a step of opening the molding mold 110 (the lower mold 110D and the upper mold 110U).

Specifically, in the mold opening step S60, by driving the drive mechanism 122, the lower mold 110D is moved down so as to be separated from the upper mold 110U. As a result, the lower mold 110D is separated from the lower surface (surface 10a) of the substrate 10.

After the mold opening is completed, the process proceeds from the mold opening step S60 to the unloading step S70.

The unloading step S70 is a step of unloading the resin-encapsulated substrate 10 from the molding mold 110.

Specifically, in the unloading step S70, the resin-encapsulated substrate 10 is removed from the upper mold 110U, and is unloaded from the molding mold 110 by a predetermined transfer device.

After the unloading of the substrate 10 is completed, the process proceeds from the unloading step S70 to the post-processing step S80.

The post-processing step S80 is a step of performing post-processing on the substrate 10.

As shown in FIGS. 10A and 10B, the mask member 130 and the unnecessary resin material 30 are attached to the substrate 10 unloaded from the molding mold 110. Therefore, in the post-processing step S80, the mask member 130 and the unnecessary resin material 30 are removed.

Specifically, as shown in FIG. 10A, the cured resin material 30 (hereinafter "unnecessary resin 31") which has tried to flow toward the substrate 10 is attached to the injection ports 132 of the mask member 130 or the vicinity thereof. Further, the cured resin material 30 (hereinafter referred to as "unnecessary resin 32") that has failed to flow toward the substrate 10 is attached to the lower surface 130a of the mask member 130.

Therefore, in the post-processing step S80, as shown in FIG. 10A, the unnecessary resin 31 is first removed. The unnecessary resin 31 is formed in substantially the same shape as the injection ports 132 of the mask member 130. That is, the unnecessary resin 31 is formed so that the thickness thereof gradually decreases toward the upper surface 130b of the mask member 130. Therefore, by appropriately applying a force to the unnecessary resin 31, the upper end portion (the thinnest portion) of the unnecessary resin 31 can be easily cut. The unnecessary resin 31 is formed with a convex portion 31a corresponding to the recess 112a of the bottom surface member 112. Therefore, a force can be applied to the unnecessary resin 31 by grasping the convex portion 31a or the like. This makes it possible to easily remove the unnecessary resin 31.

After removing the unnecessary resin 31, the mask member 130 is removed from the substrate 10 as shown in FIG. 10B. In this way, a resin-encapsulated substrate 10 (resin molded product) can be obtained with portions (lower surfaces) of the semiconductor chips 11 exposed.

As shown in FIG. 10B, the unnecessary resin 32 is removed from the lower surface 130a of the mask member 130, and the release sheet 133 and the double-sided tape 134

(see FIGS. 4A and 4B) attached to the mask member 130 are replaced. By doing so, the mask member 130 can be reused.

As described above, the resin molding apparatus 100 according to the present embodiment includes: a lower mold 110D (first molding mold) provided with a side surface member 113 (first member) and a bottom surface member 112 (second member) capable of moving relative to the side surface member 113, and configured to form a cavity 110C by the side surface member 113 and the bottom surface member 112; an upper mold 110U (second molding mold) capable of holding a substrate 10; and a mask member 130 supported by the side surface member 113 so as to be relatively immovable with respect to the side surface member 113, configured to make contact with a portion of the substrate 10 when the lower mold 110D and the upper mold 110U are clamped, and formed with injection ports 132 (flow portions) through which a resin material 30 existing in the cavity 110C and pressurized by the bottom surface member 112 can flow.

With such a configuration, it is possible to reduce the manufacturing cost. That is, it is possible to perform resin molding while exposing a portion of the substrate 10 without having to provide a mechanism for moving the mask member 130 in response to the clamping of the lower mold 110D and the upper mold 110U. Therefore, it is possible to simplify the structure of the apparatus and to reduce the manufacturing cost.

Further, the injection ports 132 are formed on the outer peripheral portion of the mask member 130.

With such a configuration, it is possible to reduce the manufacturing cost. That is, since the unnecessary resin 31 formed in the injection ports 132 after the resin molding can be removed with ease, it is possible to simplify the process of removing the unnecessary resin 31 and the mechanism for removing the unnecessary resin 31. Eventually, it is possible to reduce the manufacturing cost.

Further, the side surface member 113 is formed in a frame shape so as to surround the cavity 110C from a lateral side, and the outer peripheral portion of the mask member 130 is disposed so as to be placed on the side surface member 113.

With such a configuration, it is possible to simplify the structure of the resin molding apparatus 100. Eventually, it is possible to reduce the manufacturing cost.

Further, a tapered portion 131 (first tapered portion) is formed on the outer peripheral portion of the mask member 130, and the mask member 130 is disposed so that the tapered portion 131 and the side surface member 113 are in contact with each other.

With this configuration, it is possible to easily position the mask member 130. That is, when disposing the mask member 130, the tapered portion 131 can guide the mask member 130 to a predetermined position.

Further, the side surface member 113 is formed with a tapered portion 113b (second tapered portion) having a shape corresponding to the tapered portion 131, and the mask member 130 is disposed so that the tapered portion 131 and the tapered portion 113b make contact with each other.

With this configuration, it is possible to easily position the mask member 130. That is, when disposing the mask member 130, the tapered portion 131 and the tapered portion 113b can guide the mask member 130 to a predetermined position.

Further, the injection ports 132 are formed at least at two positions facing each other with the center of the mask member 130 interposed therebetween.

With this configuration, by allowing the resin material 30 to flow from the two injection ports 132 facing each other, it is possible to easily fill the resin material 30 and, eventually, suppress the generation of molding defects.

Further, the injection ports 132 are formed so as to narrow flow routes of the resin material 30 toward flow directions of the resin material 30.

With this configuration, it is possible to easily remove the unnecessary resin 31 cured at the injection ports 132. That is, the unnecessary resin 31 can be easily cut by applying a force to the portion where the flow routes are narrowed.

Further, the resin molded product manufacturing method according to the present embodiment manufactures a resin molded product through the use of the resin molding apparatus 100.

With such a configuration, it is possible to reduce the manufacturing cost.

The resin molded product manufacturing method according to the present embodiment includes: a mask member disposing step S30 of disposing a mask member 130 so as to be relatively immovable with respect to a lower mold 110D (first molding mold) forming a cavity 110C in which a resin material 30 is accommodated; a mold clamping step S40 of, after the mask member disposing step S30, clamping the lower mold 110D and an upper mold 110U (second molding mold) holding a substrate 10, and bringing the mask member 130 into contact with a portion of the substrate 10; and a molding step S50 of performing resin molding on the substrate 10 by pressurizing the resin material 30 in the cavity 110C to allow the resin material 30 to flow through injection ports 132 (flow portions) formed in the mask member 130.

With such a configuration, it is possible to reduce the manufacturing cost. That is, it is possible to perform resin molding while exposing a portion of the substrate 10 without having to provide a mechanism for moving the mask member 130 in response to the clamping of the lower mold 110D and the upper mold 110U. Therefore, it is possible to simplify the manufacturing process and, eventually, reduce the manufacturing cost.

Further, the injection ports 132 are formed on the outer peripheral portion of the mask member 130.

With such a configuration, it is possible to reduce the manufacturing cost. That is, since the unnecessary resin 31 formed in the injection ports 132 after the resin molding can be removed with ease, it is possible to reduce the manufacturing cost.

Although the embodiments of the present disclosure have been described above, the present disclosure is not limited to the above-described embodiments, and may be appropriately modified within the scope of the technical idea of the present disclosure recited in the claims.

For example, in the present embodiment, the resin molding apparatus 100 using the rectangular cavity 110C and the rectangular substrate 10 has been illustrated. However, the shapes of the cavity 110C and the substrate 10 are not limited thereto. For example, a circular substrate 10 may be used. In this case, it is also possible to form the shape of the cavity 110C into a circular shape in a plan view according to the shape of the substrate 10.

Further, in the present embodiment, there has been illustrated the example in which the rectangular mask member 130 corresponding to the shape of the cavity 110C is used. However, the shape of the mask member 130 is not limited thereto, and may be any shape. For example, if the cavity 110C is formed in a circular shape in a plan view as mentioned above, the mask member 130 may also be formed in a circular shape.

Further, in the present embodiment, there has been illustrated the example in which the flat plate-shaped mask member 130 is used. However, the present disclosure is not limited thereto. For example, when a plurality of semiconductor chips 11 having different heights is arranged on the substrate 10, uneven portions corresponding to the respective semiconductor chips 11 may be formed on the upper surface 130b of the mask member 130 so that the mask member 130 can make contact with the respective semiconductor chips 11. By doing so, the semiconductor chips 11 having different heights can be resin-molded in an exposed state.

Further, in the present embodiment, there has been illustrated the example in which the tapered portions (the tapered portion 131 and the tapered portion 113b) are formed on the mask member 130 and the side surface member 113, respectively. However, the present disclosure is not limited thereto. For example, it is possible to form the tapered portion only on either the mask member 130 or the side surface member 113. Further, in general, a tapered portion (a draft for taking out a resin molded product from a mold) is formed on the side surface of the cavity 110C. Therefore, the mask member 130 may be disposed through the use of this tapered portion. In this case, the exposure molding of the chips or the like can be easily performed by merely adding the mask member 130 to the existing resin molding apparatus.

Further, in the present embodiment, there has been illustrated the example in which the injection ports 132 are formed on the respective sides of the mask member 130 (see FIGS. 4A and 4B). However, the present disclosure is not limited thereto. Any other number of injection ports 132 may be formed at any other positions.

Figure 11A:
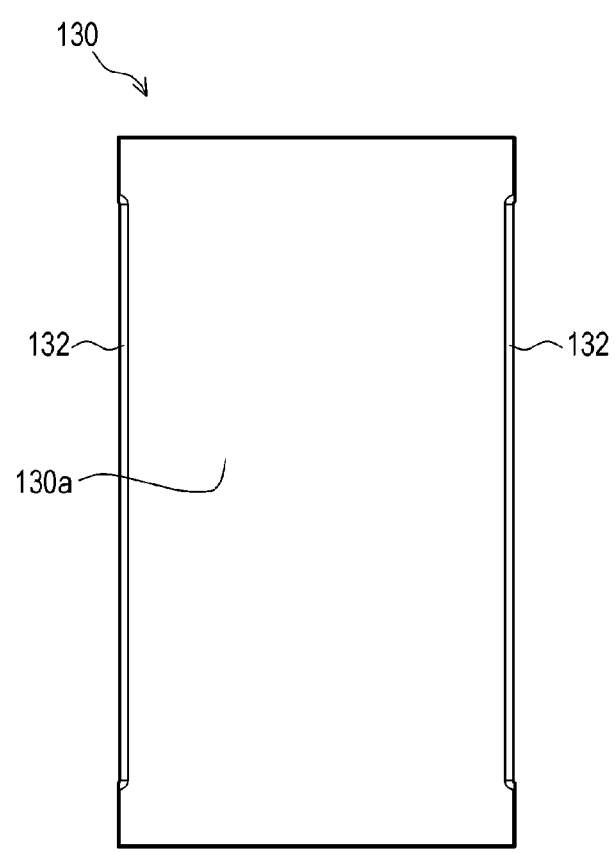
FIGS. 11A and 11B are views showing modifications of the mask member.

For example, as shown in FIG. 11A, the injection ports 132 may be formed only at two locations facing each other with the center of the mask member 130 interposed therebetween. Specifically, FIG. 11A shows an example in which the injection ports 132 are formed only on a pair of opposite sides (two sides) of the rectangular mask member 130. With this configuration, when the resin material 30 flows from the left and right injection ports 132 on the drawing sheet surface (FIG. 11A) toward the center of the mask member 130 in the molding step S50, the air in the cavity becomes easier to escape in the vertical direction on the drawing sheet surface. As a result, it is possible to suppress the occurrence of defects such as voids, non-filling and the like.

Figure 11B:
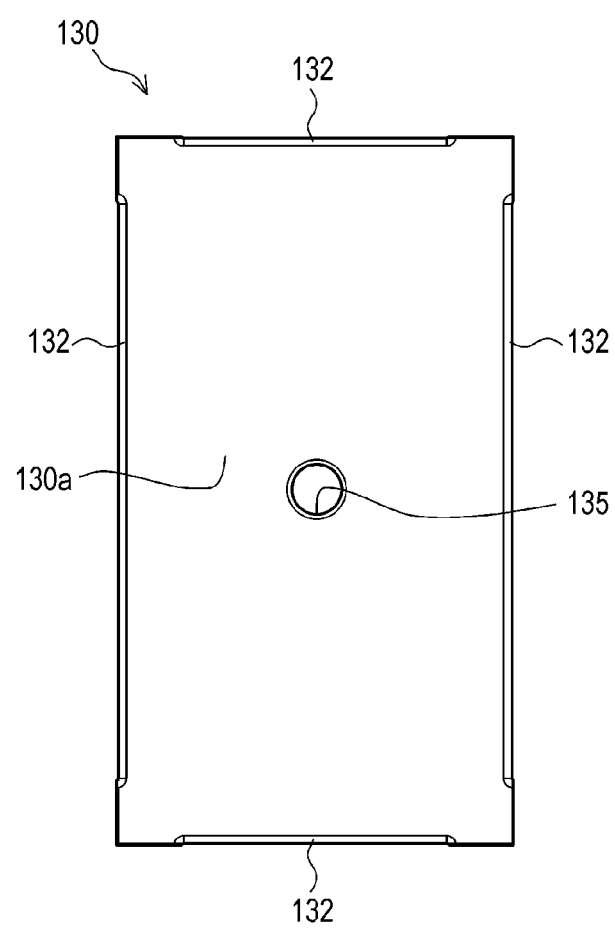

Further, as shown in FIG. 11B, an injection port may be formed in a portion other than the outer peripheral portion of the mask member 130. FIG. 11B shows an example in which an injection port 135 is formed so as to penetrate the central portion of the mask member 130. By appropriately forming the injection port 135 in the portion other than the outer peripheral portion of the mask member 130 in this way, it is possible to suppress the occurrence of defects such as voids, non-filling and the like. A plurality of such injection ports 135 may be formed at appropriate positions.

Further, in the present embodiment, there has been illustrated the example (see FIG. 7) in which the mask member 130 is disposed so as to be placed on the tapered portion 113b of the side surface member 113. However, the present disclosure is not limited thereto.

Figure 12A:
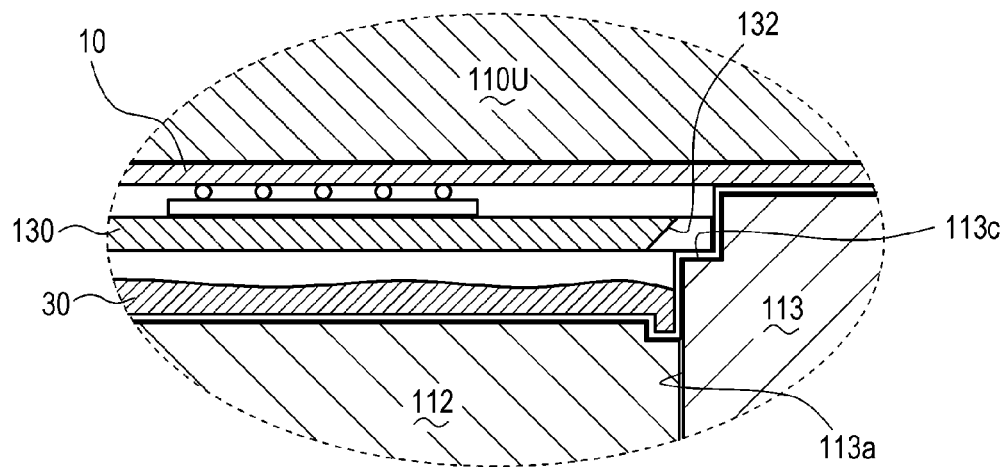
FIGS. 12A and 12B are views showing modifications of the mask member disposing method.

For example, by providing a step in the hollow portion 113a of the side surface member 113 as shown in FIG. 12A, a horizontal surface 113c may be formed so that the mask member 130 can be disposed on the horizontal surface 113c.

Figure 12B:
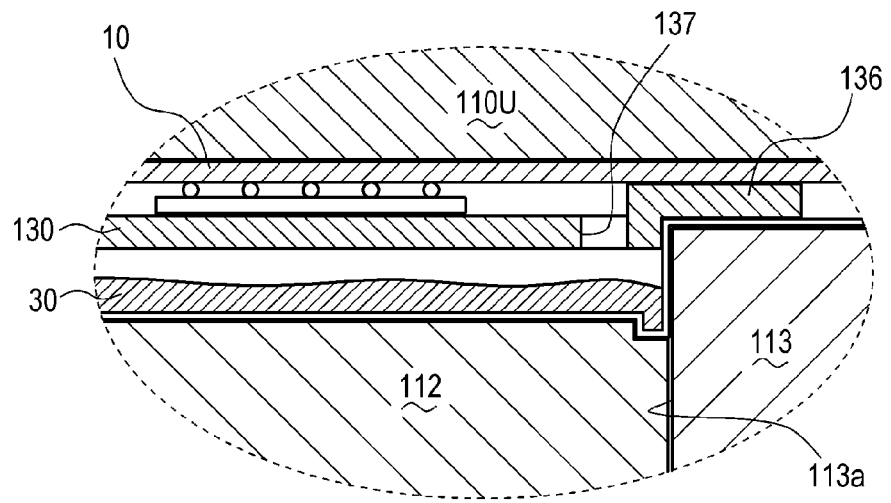

Further, as shown in FIG. 12B, the mask member 130 may be placed on the upper surface of the side surface member 113, and the mask member 130 may be sandwiched and held between the side surface member 113 and the substrate 10 (or the upper mold 110U). In this case, the mask member 130 is formed with a brim-shaped portion 136 sandwiched between the side surface member 113 and the substrate 10. Further, in this case, for example, the resin material 30 can be allowed to flow toward the substrate 10 through a hole (injection port 137) formed so as to penetrate the mask member 130.

Further, in the present embodiment, there has been illustrated the example in which molding is performed while exposing the semiconductor chips 11. However, the object to be exposed is not limited thereto. An arbitrary portion (e.g., an electrode or a heat sink) of the substrate 10 may be exposed.

Further, the resin molded product manufacturing method exemplified in the present embodiment (the process sequence, the work content and procedure in each process, etc.) is nothing more than an example, and may be arbitrarily changed.

According to the present disclosure in some embodiments, it is possible to reduce the manufacturing cost.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

DESCRIPTION OF REFERENCE NUMERALS

10: substrate, 30: resin material, 100: resin molding apparatus, 110: molding mold, 110D: lower mold, 110U: upper mold, 110C: cavity, 112: bottom surface member, 113: side surface member, 113b: tapered portion, 120: mold clamping mechanism, 130: mask member, 131: tapered portion, 132: injection port

What is claimed is:

1. A resin molding apparatus, comprising:
a lower mold provided with a side surface member and a bottom surface member, which is configured to be capable of moving up and down with respect to the side surface member, and configured to form a cavity by the side surface member and the bottom surface member, wherein the side surface member surrounds the bottom surface member;
an upper mold configured to hold a substrate; and
a metallic mask configured to make partial contact with the side surface member, configured to be formed substantially in a form of the cavity, configured to make contact with a portion of the substrate when the lower mold and the upper mold are clamped, and formed with a flow portion through which a resin material existing in the cavity and pressurized by the bottom surface member is capable of flowing.

2. The resin molding apparatus of claim 1, wherein the flow portion is formed on an outer peripheral portion of the metallic mask.

3. The resin molding apparatus of claim 1, wherein the side surface member is formed in a frame shape so as to surround the cavity from a lateral side, and wherein an outer peripheral portion of the metallic mask is disposed to be placed on the side surface member.

4. The resin molding apparatus of claim 3, wherein a first tapered portion is formed on the outer peripheral portion of the metallic mask, and
wherein the metallic mask is disposed so that the first tapered portion comes into contact with the side surface member.

5. The resin molding apparatus of claim 4, wherein a second tapered portion having a shape corresponding to the first tapered portion is formed on the side surface member, and
wherein the metallic mask is disposed so that the first tapered portion comes into contact with the second tapered portion.

6. The resin molding apparatus of claim 1, wherein the flow portion is formed at least at two locations facing each other with a center of the metallic mask interposed therebetween.

7. The resin molding apparatus of claim 1, wherein the flow portion is formed so as to narrow a flow route of the resin material toward a flow direction of the resin material.

8. A method of manufacturing a resin molded product by using the resin molding apparatus of claim 1.

9. A method of manufacturing a resin molded product, comprising:
disposing a metallic mask configured to make partial contact with a side surface member of a lower mold forming a cavity, in which a resin material is accommodated, with a bottom surface member of the lower mold configured to be capable of moving up and down with respect to the side surface member, wherein the metallic mask configured to be formed substantially in a form of the cavity and wherein the side surface member surrounds the bottom surface member;
clamping the lower mold and an upper mold holding a substrate, and bringing the disposed metallic mask into contact with a portion of the substrate; and
performing a resin molding on the substrate by pressurizing the resin material in the cavity to allow the resin material to flow through a flow portion formed in the metallic mask.

10. The method of claim 9, wherein the flow portion is formed on an outer peripheral portion of the metallic mask.

* * * * *